United States Patent
Wang

(10) Patent No.: US 7,631,457 B2
(45) Date of Patent: Dec. 15, 2009

(54) PLANT POTTING HAVING A SOUNDING EFFECT

(76) Inventor: Chien-Jen Wang, 58, Ma Yuan West St., Taichung (TW)

( * ) Notice: Subject to any disclaimer, the term of this patent is extended or adjusted under 35 U.S.C. 154(b) by 190 days.

(21) Appl. No.: 12/004,646

(22) Filed: Dec. 26, 2007

(65) Prior Publication Data

US 2008/0271372 A1    Nov. 6, 2008

(30) Foreign Application Priority Data

Jan. 5, 2007    (TW) ................. 96200245 U

(51) Int. Cl.
*A01G 9/02* (2006.01)
*A47G 7/00* (2006.01)
(52) U.S. Cl. ..................... 47/41.01; 47/66.6
(58) Field of Classification Search ............. 47/41.01, 47/66.6, 65.5, 1.3, 39, 41.11, 41.12, 41.13; 248/27.8, 15, 17, 34.1; 434/93, 81
See application file for complete search history.

(56) References Cited

U.S. PATENT DOCUMENTS 4,063,387 A * 12/1977 Mitchell ................. 47/67
5,860,248 A * 1/1999 Peters ..................... 47/67
5,969,620 A * 10/1999 Okulov ................. 340/620
2003/0204990 A1* 11/2003 Hsueh ................... 47/66.6

FOREIGN PATENT DOCUMENTS

JP    2002065068 A  *  3/2002

* cited by examiner

*Primary Examiner*—Son T Nguyen
*Assistant Examiner*—Marisa Conlon
(74) *Attorney, Agent, or Firm*—Alan Kamrath; Kamrath & Associates PA

(57) ABSTRACT

A plant potting includes a base, a magnet mounted in the base and connected to an electric cord, a damper mounted on the magnet, a vibration absorber mounted in the base and located above the damper, a vibrator protruding outwardly from the base and connected to the vibration absorber, a vibration receiver having a lower end connected to the vibrator, a pin holder mounted on an upper end of the vibration receiver, and a plant mounted on the pin holder. Thus, the stems, the flowers and the leaves of the plant function as a medium to transmit the sound wave from the sound so as to output a sound wave in a different sound transmitting way, thereby enhancing the sounding effect of the sound.

9 Claims, 3 Drawing Sheets

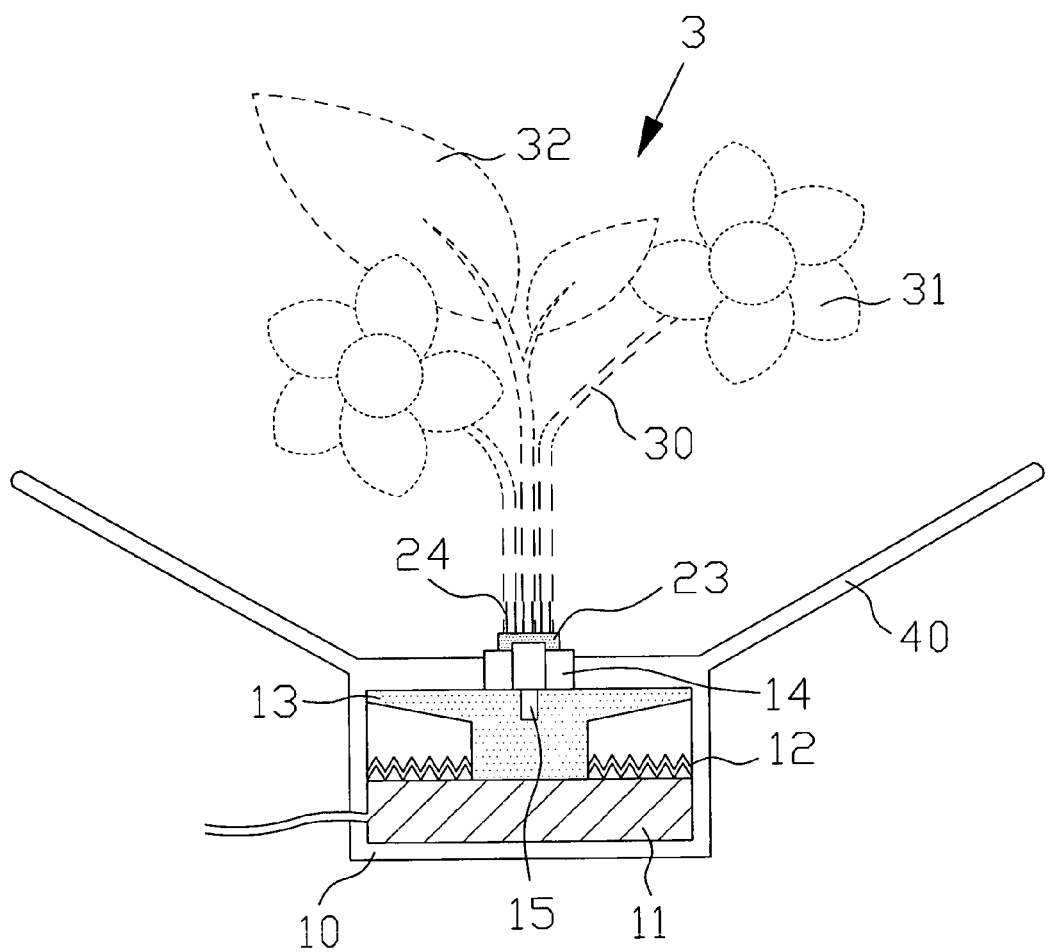
F I G. 2

PLANT POTTING HAVING A SOUNDING EFFECT

BACKGROUND OF THE INVENTION

1. Field of the Invention

The present invention relates to a plant potting and, more particularly, to a plant potting combined with a sound.

2. Description of the Related Art

A conventional sound comprises a loudspeaker to amplify the sound wave from the sound and to output the sound wave. However, the loudspeaker has an expensive price, thereby increasing the costs of the sound. In addition, the sound has to output the sound wave by transmission of the loudspeaker, thereby limiting the versatility of the sound. A conventional plant potting comprises a vase to receive a plant therein and a pin holder to fix the plant. Thus, the plant potting has an outstanding appearance by decoration of the plant. However, the plant potting only has a single function, thereby limiting the versatility of the plant potting.

BRIEF SUMMARY OF THE INVENTION

In accordance with the present invention, there is provided a plant potting, comprising a base, a magnet mounted in the base and connected to an electric cord, a damper mounted on the magnet, a vibration absorber mounted in the base and located above the damper, a vibrator protruding outwardly from the base and connected to the vibration absorber, a vibration receiver having a lower end connected to the vibrator, a pin holder mounted on an upper end of the vibration receiver, and a plant mounted on the pin holder.

The primary objective of the present invention is to provide a plant potting having a sounding or acoustic effect.

Another objective of the present invention is to provide a plant potting, wherein the stems, the flowers and the leaves of the plant function as a medium to transmit the sound wave from the sound so as to output a sound wave in a different sound transmitting way, thereby enhancing the sounding effect of the sound.

A further objective of the present invention is to provide a plant potting, wherein the sound wave from the sound is transmitted directly or indirectly by the vibrator to the pin holder so that the sound wave is transmitted through the longitudinal fibers of the stems of the plant to the flowers and the leaves of the plant so as to output a sound wave from the plant by vibration of the flowers and the leaves of the plant.

A further objective of the present invention is to provide a plant potting, wherein the plant potting has an outstanding appearance by decoration of the plant and can output a sound wave from the plant so that a user can watch the plant and can also listen to the music from the plant in a different sound transmitting way, thereby enhancing the versatility of the plant potting.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 2 is a front cross-sectional view of a plant potting in accordance with another preferred embodiment of the present invention.

DETAILED DESCRIPTION OF THE INVENTION

Figure 1:
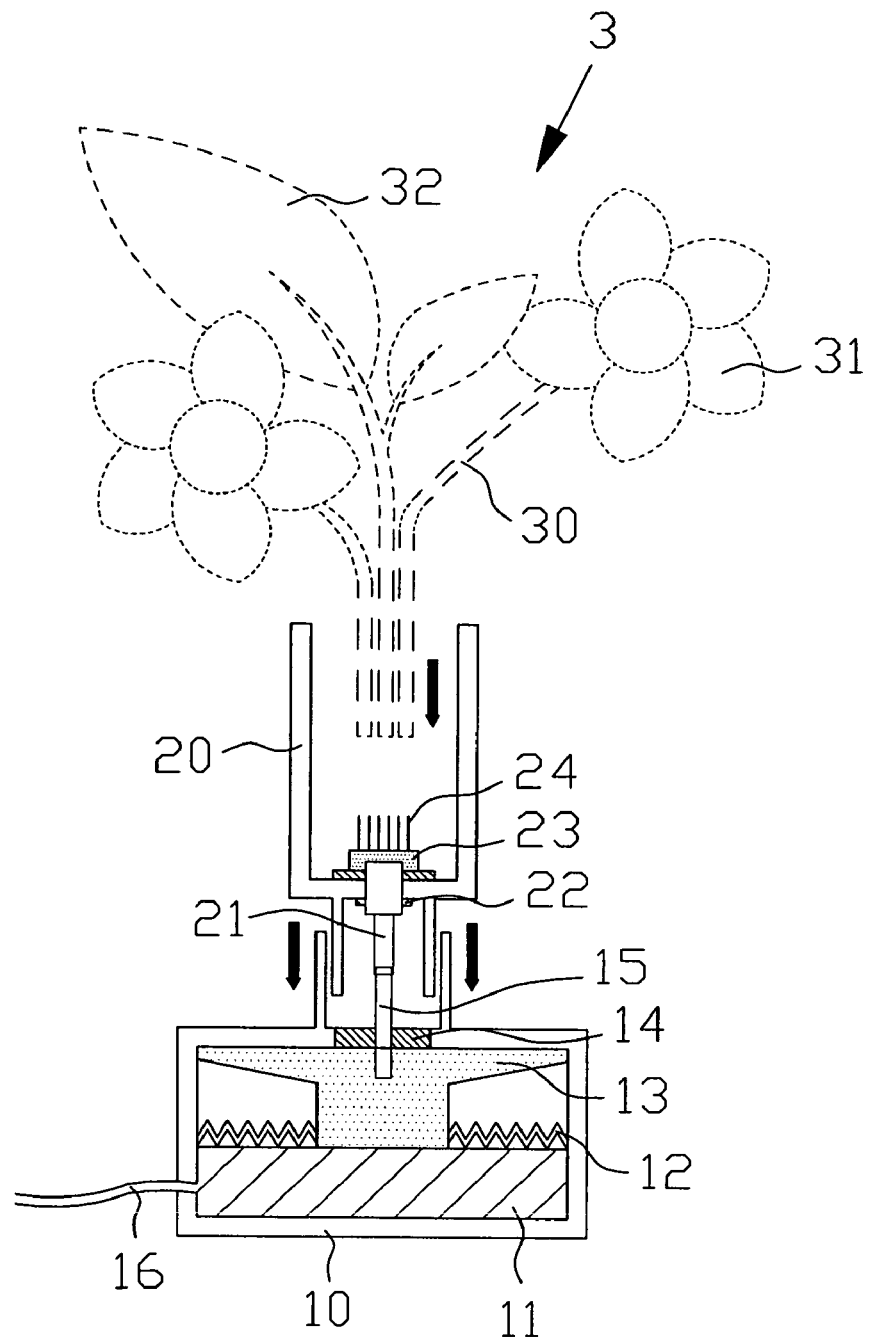
FIG. 1 is a front cross-sectional view of a plant potting in accordance with the preferred embodiment of the present invention.

Referring to the drawings and initially to FIG. 1, a plant potting for gathering or cultivating a plant in accordance with the preferred embodiment of the present invention comprises a base 10, a magnet 11 mounted in the base 10 and connected to an electric cord 16, a damper 12 mounted on the magnet 11, a vibration absorber 13 mounted in the base 10 and located above the damper 12, a vibrator 15 protruding outwardly from the base 10 and connected to the vibration absorber 13, a vibration receiver 23 having a lower end connected to the vibrator 15, a pin holder 24 mounted on an upper end of the vibration receiver 23, and a plant 3 mounted on the pin holder 24. Thus, the magnet 11 produces a vibration or shock which is transmitted to the plant 3 to output a sound wave from the plant 3.

The plant potting further comprises a container 20 mounted on a top of the base 10 to receive the vibration receiver 23, the pin holder 24 and the plant 3 therein, a vibration connector 21 connected between the vibrator 15 and the vibration receiver 23 so that the vibrator 15 is connected to the vibration receiver 23 indirectly by the vibration connector 21, a first washer 14 mounted on the base 10 and connected between the base 10 and the vibrator 15, and a second washer 22 mounted on the container 20 and connected between the container 20 and the vibration connector 21. Preferably, the container 20 is mounted on the top of the base 10 by insert fitting.

In practice, an electric current flows through the electric cord 16 into the base 10 to energize the magnet 11. Then, the magnet 11 that is energized produces a magnetic field to drive the damper 12 to vibrate or shock by attraction or repulsion action of the magnetic field so that the damper 12 produces a vibration or shock. Then, the vibration from the damper 12 is absorbed by the vibration absorber 13. Then, the vibration from the vibration absorber 13 is transmitted through the vibrator 15 and the vibration connector 21 to the vibration receiver 23 and is gathered by the vibration receiver 23. Then, the vibration from the vibration receiver 23 is transmitted to the pin holder 24. Then, the vibration from the pin holder 24 is transmitted through longitudinal fibers of the stems 30 of the plant 3 to flowers 31 and leaves 32 of the plant 3 so as to output a sound wave from the plant 3 by vibration of the flowers 31 and the leaves 32 of the plant 3. At this time, the first washer 14 between the base 10 and the vibrator 15 and the second washer 22 between the container 20 and the vibration connector 21 are used to prevent the vibration from being diffused or lost.

Referring to FIG. 2, the vibration connector 21 is undefined so that the vibrator 15 is connected to the vibration receiver 23 directly. In addition, the container 40 has a different shape. Preferably, the container 40 is integrally formed on the top of the base 10.

Figure 3:
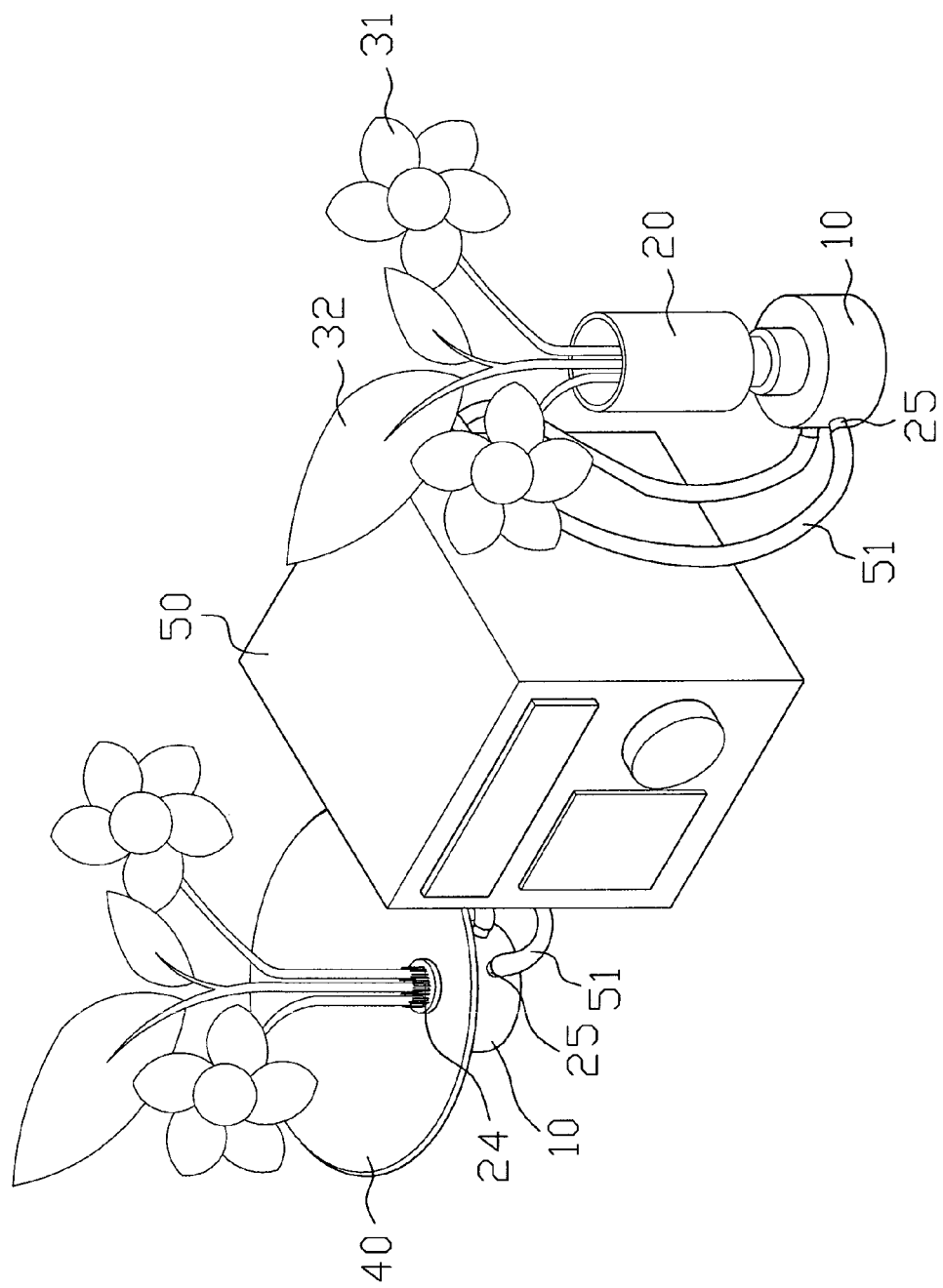
FIG. 3 is a perspective view showing the plant potting for a sound.

Referring to FIG. 3, the base 10 is connected to a transmission cord 51 by a connecting terminal 25 to receive a sound wave signal from a sound 50 and to transmit the sound wave signal to the flowers 31 and the leaves 32 of the plant 3 so as to output a sound wave from the plant 3.

Accordingly, the stems 30, the flowers 31 and the leaves 32 of the plant 3 function as a medium to transmit the sound wave from the sound 50 so as to output a sound wave in a different sound transmitting way, thereby enhancing the sounding effect of the sound 50. In addition, the sound wave from the sound 50 is transmitted directly or indirectly by the vibrator 15 to the pin holder 24 so that the sound wave is transmitted through the longitudinal fibers of the stems 30 of the plant 3 to the flowers 31 and the leaves 32 of the plant 3 so as to output a sound wave from the plant 3 by vibration of the flowers 31 and the leaves 32 of the plant 3. Further, the plant potting has an outstanding appearance by decoration of the plant 3 and can output a sound wave from the plant 3 so that a user can watch the plant 3 and can also listen to the music from the plant 3 in a different sound transmitting way, thereby enhancing the versatility of the plant potting.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A plant potting, comprising:
    a base;
    a magnet mounted in the base and connected to an electric cord;
    a damper mounted on the magnet;
    a vibration absorber mounted in the base and located above the damper;
    a vibrator protruding outwardly from the base and connected to the vibration absorber;
    a vibration receiver having a lower end connected to the vibrator;
    a pin holder mounted on an upper end of the vibration receiver;
    a plant mounted on the pin holder, a container mounted on a top of the base to receive the vibration receiver, the pin holder and the plant therein.

2. The plant potting in accordance with claim 1, wherein the magnet produces a vibration which is transmitted to flowers and leaves of the plant to produce a sound wave by an interaction therebetween so as to output the sound wave from the flowers and the leaves of the plant.

3. The plant potting in accordance with claim 1, further comprising a vibration connector connected between the vibrator and the vibration receiver so that the vibrator is connected to the vibration receiver indirectly by the vibration connector.

4. The plant potting in accordance with claim 1, further comprising a washer mounted on the base and connected between the base and the vibrator.

5. The plant potting in accordance with claim 1, further comprising a washer mounted on the container and connected between the container and the vibration connector.

6. The plant potting in accordance with claim 1, wherein the container is mounted on the top of the base by insert fitting.

7. The plant potting in accordance with claim 1, wherein the vibrator is connected to the vibration receiver directly.

8. The plant potting in accordance with claim 1, wherein the container has different shapes.

9. The plant potting in accordance with claim 1, wherein the container is integrally formed on the top of the base.

* * * * *